United States Patent Office 3,050,552
Patented Aug. 21, 1962

3,050,552
STABLE ANHYDROUS DISODIUM ETHYLENE BISDITHIOCARBAMATE
Joseph W. Nemec, Abington, and Stanley J. Schechter, Levittown, Pa., assignors to Rohm & Haas Company, Philadelphia, Pa., a corporation of Delaware
No Drawing. Filed Jan. 30, 1959, Ser. No. 790,070
7 Claims. (Cl. 260—500)

This invention deals with stable anhydrous disodium ethylene bisdithiocarbamate as a new composition of matter. It further deals with a method for the preparation of stable anhydrous disodium ethylene bisdithiocarbamate.

The fungicidal activity of materials containing disodium ethylene bisdithiocarbamate was first reported by Hester (United States Patent 2,317,765 and Re. 23,742) and Dimond, Heuberger and Horsfall (Phytopath., 33, 1095–1097, 1943). Yakubovich and Klemova (J. Gen. Chem., 9, 1777, 1939) clearly demonstrated that the solid isolated from the aqueous reaction mixture of ethylene diamine and two moles each of carbon disulfide and sodium hydroxide was the chemical compound disodium ethylene bisdithiocarbamate hexahydrate having the formula

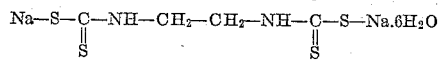

and which has a melting point of about 80° C.

Originally, this fungicidally active material was marketed as the solid disodium ethylene bisdithiocarbamate hexahydrate. The instability of this compound both during manufacture and on subsequent storage prior to application is widely recognized. This instability leads to a marked diminution of the desired fungicidal properties which the compound itself would otherwise possess and the variable deterioration of the compound on storage renders impractical the commercial exploitation of this highly potent fungicide in a solid form. Furthermore, this instability leads to the formation of products that are malodorous and flammable, and therefore obnoxious and dangerous.

The art then turned to other chemical maneuvers in order to be able to manufacture and transport this desirable fungicide in a stable and usable form. The use of aqueous solutions of various concentrations, variations of the pH of the reaction and storage solutions, modifications of the process parameters employed in the production of the solutions and the addition of various chemical agents were all critically examined by those familiar with the art. In each instance, a substance had to be added to impart a stabilizing effect to the active fungicide. While some progress has been made in this stabilization problem by the addition of various agents, there still remains a great deal to be desired.

The trade has partially solved the problem of providing the highly active fungicide to the agricultural user by the manufacture and sale of an aqueous solution containing about 30% disodium ethylene bisdithiocarbamate hexahydrate. Although this composition is relatively stable during manufacture, shipment and storage, this practice still contains a number of objectionable features such as the packaging and shipping of extensive quantities of water. Obviously, this is highly undesirable because of the inconvenience and the expense involved.

We have now found that it is possible to produce a new solid form of this active fungicide. Substantially anhydrous disodium ethylene bisdithiocarbamate,

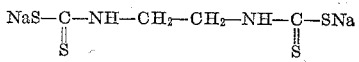

a new composition of matter, has been obtained, by a process hereinafter described, as a compound which contains no water of hydration. Surprisingly, anhydrous disodium ethylene bisdithiocarbamate is a highly stable compound which has a high melting point of about 230° C. This stable solid not only may be employed in all the present applications of the aqueous solutions of disodium ethylene bisdithiocarbamate but also has additional operational utility as will be further demonstrated. The economic advantages of the sale of an essentially 100% material over the present about 30% active material are of course obvious.

The stability of the anhydrous material is unexpected in view of the past experience with the instability of the hexahydrate. Those familiar with the behavior and properties of hydrated salts of organic and inorganic compounds would expect the hydrated form to be at least as stable as the anhydrous salt. In other words, the high stability of the anhydrous disodium ethylene bisdithiocarbamate is surprising and unexpected. Also, hydrated salts of heat sensitive acids are often appreciably degraded when subjected to the usual drying conditions. We, on the other hand, have observed high stability of anhydrous sodium ethylene bisdithiocarbamate during production and under a variety of storage conditions.

A purpose of the present invention is to provide for the first time anhydrous disodium ethylene bisdithiocarbamate, that is, disodium ethylene bisdithiocarbamate substantially free of water of hydration. The known disodium ethylene bisdithiocarbamate hexahydrate is a crystalline material which melts in the range of about 80° to 100° C., and in the purified state at about 85° C. The new product of the present invention is obtained as a crystalline material which melts at over 200° C. and usually at about 230° C.

Another purpose of the present invention is to provide an efficient and dependable process for producing disodium ethylene bisdithiocarbamate substantially free of water of hydration.

A solution of disodium ethylene bisdithiocarbamate hexahydrate is conveniently prepared by reacting in water one mole of ethylene diamine and two moles each of carbon disulfide and sodium hydroxide. The stated reactants may be employed in any desired order of addition with comparable results. Water is a by-product of this reaction. Water is employed as a solvent for the ethylene diamine, the sodium hydroxide, and the product, and it normally is present in an amount sufficient to maintain the disodium ethylene bisdithiocarbamate hexahydrate in solution. The commercial solution contains about 78% water.

For the present purposes an aqueous hexahydrate solution is a satisfactory starting material for the process of this invention. At concentrations of about 40% by weight hexahydrate and above, it is necessary to heat the system in order to maintain an aqueous solution of the hexahydrate. Usually, it is practical to employ an aqueous solution of no more than about a 70% by weight concentration of the hexahydrate and at such a concentration a temperature of the aqueous system of about 50° C. is required in order to maintain the solution. The use of concentrations of appreciably below 30% of hexahydrate tend to minimize the yields and generally to complicate the preferred process of this invention and, hence, are not recommended.

While a solution of the hexahydrate in water is the preferred starting material, as has been discussed heretofore, is is possible and satisfactory to employ a slurry of the hexahydrate in water, particularly when the hexahydrate particles are relatively small. With respect to both the solution and the slurry, it is to be understood that small amounts of excess reactants may be present in the aqueous system without interfering with the desired results of this invention. One of the distinct advantages of the preferred process of this invention is that one is able to employ the reaction medium, in which the disodium ethylene bisdithiocarbamate hexahydrate is formed, as a starting material. In this respect, it is possible to employ hexahydrate crystals, that have preferably been comminuted, as a starting material and such a material is to be construed as being within the gamut of this invention.

The conversion of the hexahydrate to the anhydrous product involves the following transformations:

(1) 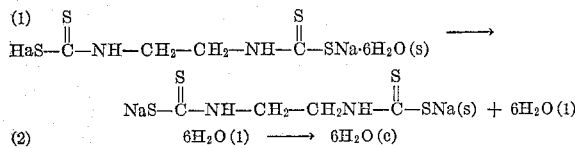

$$HaS-\overset{S}{\underset{\|}{C}}-NH-CH_2-CH_2-NH-\overset{S}{\underset{\|}{C}}-SNa \cdot 6H_2O\,(s) \longrightarrow$$

$$NaS-\overset{S}{\underset{\|}{C}}-NH-CH_2-CH_2NH-\overset{S}{\underset{\|}{C}}-SNa\,(s) + 6H_2O\,(l)$$

(2) $6H_2O\,(l) \longrightarrow 6H_2O\,(c)$

We have found that the heat of hydration of the anhydrous product is about 18.8 kcal. per mole. Accordingly, since reaction (1) is the reverse of this reaction, i.e., dehydration, then reaction (1) is endothermic and energy must be supplied to the system to effect this conversion. Also, reaction (2), the vaporization of water, requires the addition of energy. However, not only must energy, as for example heat, be supplied to the system but also the vaporized water must also be removed from the environment to permit the formation of the desired anhydrous product. Accordingly, the conversion involves the simultaneous application of heat and the mass transfer of water and dried product from the system.

Both the starting material and the product are considered heat sensitive materials and the chemical stability of both is decreased by the presence of water vapor. Accordingly, in order to effect the production of the anhydrous product in an efficient and satisfactory manner, a process must be employed which involves subjecting the hexahydrate starting material to a minimum temperature to carry out the reaction in a very short time with rapid removal of the water from the system. In other words, the conversion of the hexahydrate to the anhydrous product must be performed rapidly and essentially immediate removal of the product from the unfavorable environment is required.

We have discovered a process for the efficient and complete conversion of mixtures comprising the hexahydrate to anhydrous disodium ethylene bisdithiocarbamate which involves the introduction of extremely small particles of the hexahydrate mixture into an environment which provides rapid conversion under relatively mild conditions followed by an essentially immediate separation of the desired product.

Although various concentrations of the aqueous hexahydrate solution may be employed in the present invention, as previously suggested, a concentration of about 70% by weight hexahydrate is recommended for practical reasons. It is usually preferable to preheat the hexahydrate feed or charge in order to obtain maximal heat transfer benefits in the dehydrating unit. Such preheat temperatures as about 50° C. to about 100° C. are frequently advantageous.

It is essential when introducing the disodium ethylene bisdithiocarbamate hexahydrate into the dehydration environment to employ a small particle size or droplet. The resulting large specific surface area of the small particles allows for the rapid removal of the water leaving the dry product in the form of a powder. This allows the process to be operable and tends to produce highest yields in minimal times. When a solution is used as the hexahydrate charge, it may advantageously be introduced by an atomizing or a spraying technique. A preferred embodiment is to introduce an aqueous system, containing the hexahydrate, into the reaction environment by spraying, using a high speed centrifugal atomizer disk. The use of this feed system provides for the obtaining of a uniform size distribution in the atomized liquid and the rapid discharge of these particles at high speeds into the surrounding hot gases.

The system containing disodium ethylene bisdithiocarbamate hexahydrate is introduced by methods already described into a heated dehydrating unit in which the environmental temperature is maintained by a continuous feeding of hot air to the system. The temperature of the hot air must be at a level considerably above the melting range of the hexahydrate, preferably at least about 235° C., so that the temperature of the disodium ethylene bisdithiocarbamate hexahydrate fed to the reaction atmosphere is rapidly, in fact substantially instantaneously, raised to effect almost immediate conversion of the hexahydrate to the anhydrous ethylene bisdithiocarbamate. The use of a preheated feed and the introduction of the feed as small particles permits the use of air temperatures adequate to effect the desired conversion at a rapid rate but sufficiently low so as not to appreciably increase the temperature of the resulting product. If appreciably lower temperatures are employed, the hexahydrate is merely dried of physically held water, and then as the temperature rises, as would result if the product were not dehydrated, the hexahydrate melts and degrades. Such a result is the common experience in the prior art, but one that would frustrate the objects of this invention.

The temperature of the hot air stream to the dehydrating atmosphere or environment may be as high as 335° C. or as low as 235° C. The preferred temperature range, however, is about 305° to about 320° C. If the operating temperatures are in the high range suggested above then the time of exposure must be controlled so that the resulting anhydrous product must be rapidly removed from the reaction atmosphere. In this way, the water of hydration is removed without adversely affecting the anhydrous product. Alternately, if the operating temperatures are the low range then the residence time must be increased to provide sufficient time to completely effect dehydration of the feed and not too long to effect degradation of the anhydrous product. Typical exposure times range from about 5 to 60 seconds depending on the operating temperature. At the preferred temperature range, the optimum residence time is in the range of about 10 to 30 seconds. These combinations of operating temperature and residence time will be clear to one skilled in the art from the teachings of this invention.

As the reaction progresses, a portion of the reaction environment becomes moist with the water from the hexahydrate charge as well as with the removed water of crystallization. The moisture should be removed from the reaction environment at a rate dependent on the rate of introduction of the charged hexahydrate so that the reaction remains on a continuous basis. In other words, this process is preferably operated continuously in such a manner that the water removed from the feed, both the free water and that formed from the conversion of the hexahydrate to the anhydrous product, is removed from the operating zone in the exiting air stream, and the product is separated and cooled.

Various techniques may be employed to control the time the aqueous system containing the hexahydrate is exposed to the stated temperatures within the reaction atmosphere or environment. A preferred embodiment consists in introducing the aqueous system containing the hexahydrate into the reaction environment, such as a reaction vessel of cylindrical shape, in an approximate horizontal plane so that a rotary motion is imparted to the hexahydrate system. As the product is formed, it impinges on the walls of the reaction vessel and gradually falls by gravity into a collecting vessel at the bottom of the reaction vessel. The bottom section of the reaction vessel may be shaped like a funnel in order to aid in conveying the product in an orderly manner into a collecting vessel. By observing the rate of collection, it is obvious to one skilled in the art how long the hexahydrate was exposed to the dehydration environment. Any desired changes in rate of exposure can then be made by varying the air-flow rate. The product is cooled just before it is collected and then conveyed directly into bags, corrugated containers or the like, for transfer and shipment to desired locations. Suitable equipment for the present process is that employed in the spray drying operation.

Under the conditions of the process of this invention, the desired product free of water of hydration is produced in high yields, in short times, and with excellent stability. While other methods, as for example oven tray drying at elevated temperatures or forced hot air oven drying, may result in the conversion of the hexahydrate mixture to some of the desired anhydrous product, the conversions are poor and the product is contaminated with various by-products which influence the degradation of the product. Such materials are unacceptable since they are highly unstable and possess poor fungicidal activity. Accordingly, another object of the present invention is to provide a method employing specific conditions under which the desired product is produced in high yields, in high purity, and with excellent stability.

The present invention may be more fully understood from the following example which is offered by way of illustration and not by way of limitation. Various embodiments can be employed within the scope of the present invention. Parts by weight are used throughout.

*Example*

A mixture containing about 70% disodium ethylene bisdithiocarbamate hexahydrate is warmed by passage through a preheater to 70° C. and introduced continuously by means of a centrifugal disk atomizer operating at 15,000 r.p.m. into the upper portion of a cylindrical unit with a flat top and a conical bottom. Heated air air at about 315° C. is introduced into the chamber at a location below the atomizer. The product is formed in the chamber and falls by gravity to the bottom of the chamber and is conveyed by cooled air into a collecting vessel. The spent moist air is withdrawn continuously from the chamber by a duct whose inlet faces the bottom of the unit. The exposure time is about 20 seconds as measured from the time of introduction of the hexahydrate system to the removal of the product from the dehydration environment. The pale yellow product has a melting point of 228° C. and a purity of 98.2% based on the standard analytical procedure for the analysis of dithiocarbamates as described in Anal. Chem. 23, 1842 (1951), "Determination of Dithiocarbamates" by D. G. Clarke, H. Baum, E. L. Stanley and W. F. Hester. The product is identified as disodium ethylene bisdithiocarbamate substantially free of water of hydration.

The above procedure is repeated with the following results:

| | Maximum Temp., ° C., of Environment | Composition of Product, Percent $NaS\overset{S}{\overset{\|}{C}}-NH-CH_2-CH_2NH-\overset{S}{\overset{\|}{C}}-S-Na$ |
|---|---|---|
| Example 2 | 330 | 95.7 |
| Example 3 | 315 | 97.4 |
| Example 4 | 250 | 87.6 |
| Example 5 | 310 | 98.4 |

In all instances, an exposure time of less than 60 seconds is employed and a product is obtained that has a melting point of 224° to 231° C.

The product of this invention on prolonged standing at atmospheric conditions tends to slowly revert to the hexahydrate with all of the attendant difficulties described heretofore. Therefore, it is preferable to store the product of this invention in an atmosphere containing minimal amounts of moisture. As a commercial expedient, it is convenient to store the product in moisture resistant, preferably moisture proof containers, such as polyethylene or aluminum foil lined bags or drums or metal drums, as the product is collected from the reaction system.

Disodium ethylene bisdithiocarbamate substantially free of water of hydration is extremely stable at the usual temperatures involved in the transport and storage of agricultural materials. Tests for storage stability in moisture proof bags were made at room temperature (about 25° C.) for 1 year and for 65 days at about 50° C. In both instances there was no apparent instability. On the other hand, as is known to the art, the hexahydrate frequently degrades during the process for its manufacture or shortly thereafter so that the undesirable effects, previously mentioned, become manifest.

As a result of its known instability, the hexahydrate is always handled, that is, shipped and stored, as an aqueous solution of various concentrations. A common commercial concentration is an aqueous 30% solution of hexahydrate. It is apparent that under such conditions a great deal of time, trouble, and expense is directed to handling a high percentage of water. This is obviously commercially disadvantageous, but nevertheless, the known instability of the hexahydrate demands such treatment. In contrast, no such coddling need be considered in handling the anhydrous product of this invention. The compound of this invention may be safely shipped and stored in selected containers, as mentioned previously, in its essentially dry state without the fears and hazards realized by similar treatment of the hexahydrate. In fact, it is possible to incorporate in the same container, intimately mixed, disodium ethylene bisdithiocarbamate substantially free of water of crystallization and metal salts such as zinc sulfate, iron sulfate, copper sulfate, manganese sulfate, or the like. No reaction or degradation occurs in the containers, as long as moisture is substantially absent or present in minimal amounts. Consequently, storage and shipping problems encountered if the corresponding hexahydrate were used are substantially eliminated. Therefore, it can be readily perceived that the unique compound of this invention can be handled in a way that the known hexahydrate cannot. This is a direct result of the stability of the novel present compound and the instability of the known hexahydrate.

The commercial aqueous solutions of the product of the present invention are frequently employed by the user to prepare the so-called tank mixes of the water-insoluble metal ethylene bisdithiocarbamates, such as zinc, iron, manganese, or copper ethylene bisdithiocarbamate. These mixes are frequently superior in the control of fungi than the preformed commercial materials. Accordingly, the unexpected stability of the anhydrous disodium ethylene bisdithiocarbamate allows the manufacturer to dry mix and package in the desired proportions the product of this invention with the aforementioned metal salts. These products are stable until ready for ultimate use and may be conveniently employed by the user to prepare highly effective fungicidal spray mixtures according to known techniques.

The manufacturer or formulator may also use the product of the present invention to prepare dry stable mixes with other pesticides. This application is particularly useful when dealing with moisture sensitive pesticides. The mixes are prepared by adding to a ribbon mixer, or the like, the product of the present invention together with other pesticidal agents, for example an insecticide, a miticide, an aphicide, and the like, and blending to provide a uniform product. The resulting stable dry mixes may then be packaged and marketed as multi-purpose pesticidal mixtures.

At the location of ultimate use, the present product may be incorporated into dusts, wettable powders, sprays, and the like, in the same way as the hexahydrate with all the remarkable fungicidal effects known to the art.

For instance, it can be used to control Fusarium seed piece decay in potatoes and Rhizoctonia, Pythium, and Fusarium infestations in cotton seddlings. It is also effective in controlling *Venturia inaqeualis* in apples, Helminthosporium on corn, *Peronospora tabacina* on tobacco, *Diplocarpon rosae* on roses, and *Alternaris solani* and Phytophthora on potatoes, among others. In all instances, there are no apparent adverse phytotoxic effects. It is frequently desirable to employ the compound of this invention in aqueous sprays in conjunction with zinc sulfate, iron sulfate, manganese sulfate, or the like, or with other pesticides or both.

Another application of the product of the present invention is as the starting material for the preparation of esters of ethylene bisdithiocarbamaic acid. The resulting esters have exhibited fungicidal activity when tested against a variety of organisms. The preparation of these esters is based on the reaction:

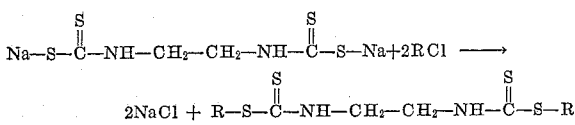

A particular advantage of the use of the anhydrous product over known hydrate forms is the absence of water in the reaction system. This is particularly important in the preparation of esters from chlorides which are readily hydrolyzed. Hydrolysis of the alkyl halide forms the corresponding alcohol which is very difficult to separate from the product. Purification of the esters is difficult since they normally cannot be distilled. Hence, employing the pure anhydrous disodium ethylene bisdithiocarbamate results in the preparation of esters of higher purity than could previously be obtained.

Other chemical reactions in which the anhydrous nature of the product of the present invention is important is in reactions with acyl chlorides and sulfonyl chlorides.

We claim:

1. A method for the preparation of stable disodium ethylene bisdithiocarbamate substantially free of water of crystallization which comprises introducing disodium ethylene bisdithiocarbamate hexahydrate into a reaction environment having a temperature in the range of about 235° C. to 335° C. sufficiently above the melting range of said hexahydrate and for a sufficient length of time to remove molecularly held water without melting the resulting anhydrous disodium ethylene bisdithiocarbamate, and removing the anhydrous product from the reaction environment.

2. A method for the preparation of stable disodium ethylene bisdithiocarbamate substantially free of water of crystallization which comprises introducing disodium ethylene bisdithiocarbamate hexahydrate into a reaction environment having a temperature in the range of about 235° C. to about 335° C. sufficiently above the melting range of said hexahydrate and for a sufficient length of time to remove molecularly held water without melting the resulting anhydrous disodium ethylene bisdithiocarbamate, and removing the anhydrous product from the reaction environment after an exposure time of about 5 to 60 seconds.

3. A method for the preparation of stable disodium ethylene bisdithiocarbamate substantially free of water of crystallization which comprises introducing disodium ethylene bisdithiocarbamate hexahydrate into a reaction environment having a temperature in the range of about 305° C. to about 320° C. sufficiently above the melting range of said hexahydrate and for a sufficient length of time to remove molecularly held water without melting the resulting anhydrous disodium ethylene bisdithiocarbamate, and removing the anhydrous product from the reaction environment after an exposure time of about 10 to 30 seconds.

4. A method for the preparation of stable disodium ethylene bisdithiocarbamate substantially free of water of crystallization which comprises introducing an aqueous system comprising disodium ethylene bisdithiocarbamate hexahydrate into a reaction in the range of about 235° C. to 335° C. environment having a temperature sufficiently above the melting range of said hexahydrate and for a sufficient length of time to remove molecularly held water without melting the resulting anhydrous disodium ethylene bisdithiocarbamate, and removing the anhydrous product from the reaction environment.

5. A method for the preparation of stable disodium ethylene bisdithiocarbamate substantially free of water of crystallization which comprises spraying an aqueous system comprising disodium ethylene bisdithiocarbamate hexahydrate into a reaction environment having a temperature in the range of about 235° C. to about 335° C. sufficiently above the melting range of said hexahydrate and for a sufficient length of time to remove molecularly held water without melting the resulting anhydrous disodium ethylene bisdithiocarbamate, and removing the anhydrous product from the reaction environment after an exposure time of about 5 to 60 seconds.

6. A method for the preparation of stable disodium ethylene bisdithiocarbamate substantially free of water of crystallization which comprises atomizing an aqueous system comprising disodium ethylene bisdithiocarbamate hexahydrate into a reaction environment having a temperature in the range of about 305° C. to about 320° C. sufficiently above the melting range of said hexahydrate and for a sufficient length of time to remove molecularly held water without melting the resulting anhydrous disodium ethylene bisdithiocarbamate, and removing the anhydrous product from the reaction environment after an exposure time of about 10 to 30 seconds.

7. A method for the preparation of stable disodium ethylene bisdithiocarbamate substantially free of water of crystallization which comprises introducing an aqueous system having a temperature of about 50° C. to 100° C. and comprising disodium ethylene bisdithiocarbamate hexahydrate into a reaction environment having a temperature in the range of about 235° C. to about 335° C. sufficiently above the melting range of said hexahydrate and for a sufficient length of time to remove molecularly held water without melting the resulting anhydrous disodium ethylene bisdithiocarbamate and removing the anhydrous product from the reaction environment after an exposure time of about 5 to 60 seconds.

References Cited in the file of this patent

UNITED STATES PATENTS

| Re. 23,742 | Hester | Nov. 24, 1953 |
| 1,610,216 | Elley | Dec. 7, 1926 |
| 1,972,961 | Tisdale | Sept. 11, 1934 |
| 2,127,375 | Bousquet | Aug. 16, 1938 |
| 2,384,577 | Thomas | Sept. 11, 1945 |
| 2,677,698 | Deutschman | May 4, 1954 |
| 2,693,485 | Goebeil | Nov. 2, 1954 |
| 2,733,262 | Britton | Jan. 31, 1956 |
| 2,766,274 | Flenner | Oct. 9, 1956 |